United States Patent
Boe et al.

(10) Patent No.: US 10,651,756 B2
(45) Date of Patent: May 12, 2020

(54) CAPACITOR BANK FOR A SUBSEA POWER CELL, SUBSEA POWER CELL AND VARIABLE FREQUENCY DRIVE HAVING A SUBSEA POWER CELL

(71) Applicant: Siemens Aktiengesellschaft, Munich (DE)

(72) Inventors: Ove Boe, Tanem (NO); Ivar Haakon Lysfjord, Inderoey (NO); Stian Skorstad Moen, Sjetnemarka (NO); Geirfinn Sirnes, Trondheim (NO); Gunnar Snilsberg, Heimdal (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/318,713

(22) PCT Filed: May 13, 2015

(86) PCT No.: PCT/EP2015/060548
§ 371 (c)(1),
(2) Date: Dec. 14, 2016

(87) PCT Pub. No.: WO2016/008612
PCT Pub. Date: Jan. 21, 2016

(65) Prior Publication Data
US 2017/0149345 A1 May 25, 2017

(30) Foreign Application Priority Data
Jul. 15, 2014 (EP) ..................................... 14177114

(51) Int. Cl.
*H02M 5/458* (2006.01)
*H01G 4/38* (2006.01)
(Continued)

(52) U.S. Cl.
CPC .............. *H02M 5/458* (2013.01); *H01G 4/38* (2013.01); *H01G 4/40* (2013.01); *H02J 7/0063* (2013.01);
(Continued)

(58) Field of Classification Search
CPC ................................ H02M 5/458; H02J 7/345
See application file for complete search history.

(56) References Cited

U.S. PATENT DOCUMENTS

| | | | | |
|---|---|---|---|---|
| 4,040,000 A | * | 8/1977 | Dwivedi | G01V 1/157 315/238 |
| 4,219,856 A | * | 8/1980 | Danfors | H02H 3/36 361/111 |

(Continued)

FOREIGN PATENT DOCUMENTS

| WO | WO-2008/055515 A1 | 5/2008 | | |
|---|---|---|---|---|
| WO | WO 2008055515 A1 | * | 5/2008 | ............... B63G 8/08 |

OTHER PUBLICATIONS

Australian Notice of Acceptance dated Feb. 6, 2017.
(Continued)

*Primary Examiner* — Jue Zhang
*Assistant Examiner* — Lakaisha Jackson
(74) *Attorney, Agent, or Firm* — Harness, Dickey & Pierce, P.L.C.

(57) ABSTRACT

A capacitor bank includes a plurality of capacitors; a plurality of resistors, each of the capacitors being in series with at least one of the resistors; and a plurality of diodes, each of the diodes being in parallel with one of the resistors. A subsea power cell for converting an electrical three phase input into an electrical one phase output, includes the capacitor bank; a diode rectifier connected to the three phase input; and a plurality of Insulated Gate Bipolar Transistors connected to the electrical one phase output.

13 Claims, 3 Drawing Sheets

(51) Int. Cl.
*H01G 4/40* (2006.01)
*H02J 7/34* (2006.01)
*H02J 7/00* (2006.01)
*H02P 27/04* (2016.01)
*H02H 7/16* (2006.01)
*H02H 9/02* (2006.01)
*H01G 4/33* (2006.01)

(52) U.S. Cl.
CPC .............. *H02J 7/345* (2013.01); *H02P 27/04* (2013.01); *H01G 4/33* (2013.01); *H02H 7/16* (2013.01); *H02H 9/02* (2013.01); *H02J 2007/0067* (2013.01)

(56) References Cited

U.S. PATENT DOCUMENTS

| | | | | |
|---|---|---|---|---|
| 5,087,999 | A * | 2/1992 | Sato | H01G 4/40 361/17 |
| 5,179,508 | A * | 1/1993 | Lange | H02J 7/0065 323/222 |
| 2006/0007614 | A1 * | 1/2006 | Pozzuoli | G06F 1/182 361/62 |
| 2006/0279249 | A1 * | 12/2006 | Rastogi | H02M 5/458 318/807 |
| 2006/0279749 | A1 | 12/2006 | Zhang et al. | |
| 2008/0024079 | A1 * | 1/2008 | Matsubara | H02J 7/345 318/376 |
| 2014/0266070 | A1 * | 9/2014 | Kurtzman | H02J 7/0052 320/149 |

OTHER PUBLICATIONS

International Search Report PCT/ISA/210 for International Application No. PCT/EP2015/060548 dated Aug. 24, 2015.
Written Opinion of the International Searching Authority PCT/ISA/237 for International Application No. PCT/EP2015/060548 dated Aug. 24, 2015.
Extended European Search Report dated Feb. 3, 2015.

\* cited by examiner

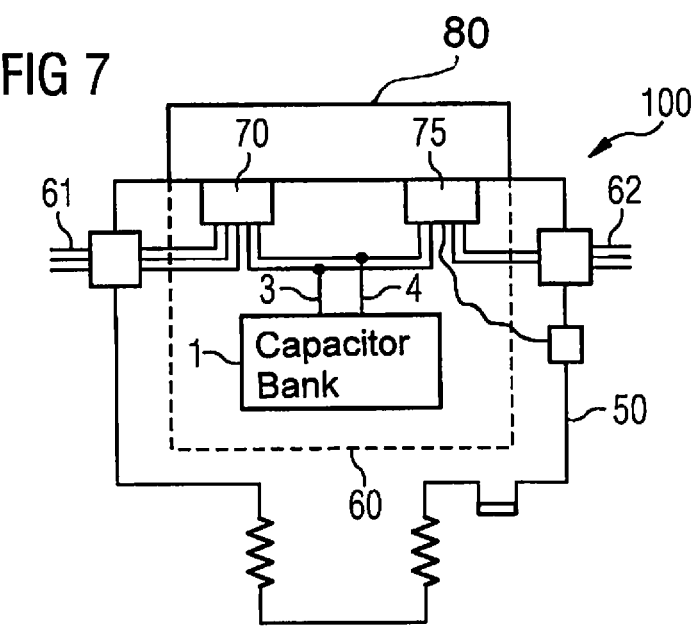
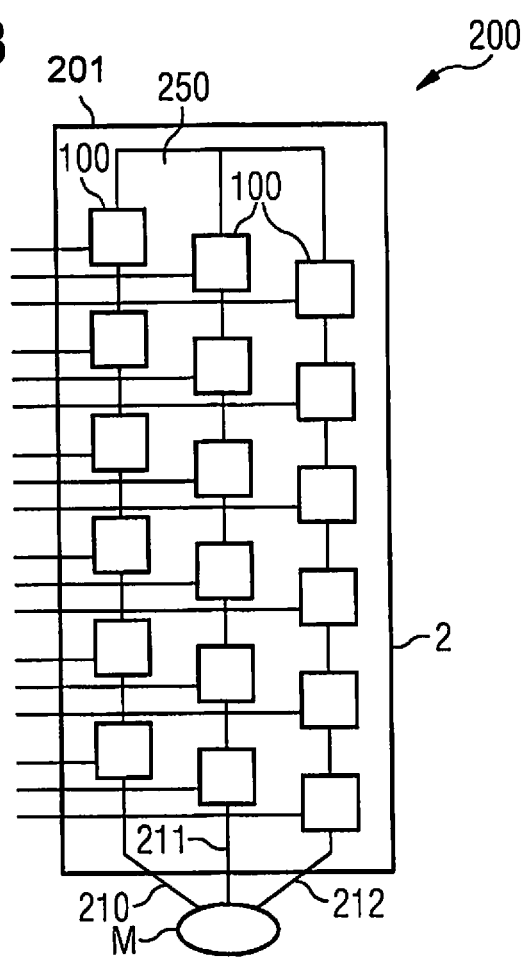

CAPACITOR BANK FOR A SUBSEA POWER CELL, SUBSEA POWER CELL AND VARIABLE FREQUENCY DRIVE HAVING A SUBSEA POWER CELL

PRIORITY STATEMENT

This application is the national phase under 35 U.S.C. § 371 of PCT International Application No. PCT/EP2015/060548 which has an International filing date of May 13, 2015, which designated the United States of America and which claims priority to European patent application number EP14177114.7 filed Jul. 15, 2014, the entire contents of which are hereby incorporated herein by reference.

FIELD OF INVENTION

At least one embodiment of the present invention generally relates to capacitor banks. At least one embodiment of the present invention relates also to a subsea electrical component including a capacitor bank for energy storage.

BACKGROUND

Subsea equipment are traditionally made by putting electrical and/or electronic components designed for atmospheric pressure into a canister at 1 atm of pressure, in order to protect them from the high ambient subsea pressure.

In power electronics, this can cause heat generation in a range that are difficult, complicated or expensive to get rid of. Power losses normally generate an increase in the temperature of the whole system included in the canister. To improve the thermal conditions, the canister is exposed to a dielectric liquid at ambient pressure with the purpose of transporting heat losses to equipment surfaces which are cooled by the ambient water.

In subsea applications energy storage may require the use of capacitor banks including a plurality of electrolytic capacitors. Capacitor banks, when used in subsea applications, need, as explained above, to be inserted in the atmospheric pressure canisters described above, as these capacitors cannot withstand higher pressure. An alternative to electrolytic capacitors is that of using film capacitors or ceramic capacitors. The use of film capacitors or ceramic capacitors may be more critical than electrolytic capacitors, as these capacitors normally have a lower capacitance, i.e. they are more subject to failures and a greater number of them have to be used to obtain the same overall capacitance.

Particularly for medium bridging times lasting up to some seconds, the storage may consist or some or a huge amount of parallel connected capacitor components. No other electrical components are normally inserted in series with the capacitors, for not affecting the current value, when discharge of the capacitor bank is requested.

If one of the capacitors has a failure, for example a short circuit, it may happen that current flows through it, thus shorting the overall storage capacity of the capacitor bank. This may cause also other failures and therefore affects the reliability and lifetime of the whole system. This is of particular importance in subsea systems, which can be accessed with difficulty or with high costs after they have been put in operation.

In known solutions of bank capacitors for subsea electrical equipment, only huge capacitor banks are sectioned by means of fuses which are able, in order to avoid major inconvenience like electric arc formation, to exclude the capacitor bank as a whole. This kind of protection is normally not present in smaller banks (i.e. for voltage drives lower than 1000V), which are therefore not even sectioned.

SUMMARY

At least one embodiment of the present invention provides a capacitor bank for subsea applications for direct current storage, whose reliability and expected lifetime is not influenced by any failure of one or more of its components.

At least one embodiment of the present invention provides an electric component for subsea applications having an improved reliability and redundancy level with respect to existing components for the same applications.

At least one embodiment of the present invention is directed to a capacitor bank and/or a subsea electric component. The claims describes advantageous developments and modifications of the invention.

According to a first embodiment of the present invention, a capacitor bank comprises:

a plurality of capacitors, a plurality of resistors, each of the capacitors being in series with at least one of the resistors, a plurality of diodes, each of the diodes being in parallel with one of the resistors.

According to a second embodiment of the present invention, a subsea electrical component, for example a power cell or an electrical variable frequency drive, comprises a circuit including at least one capacitor bank for direct current (DC) storage according to at least one embodiment of the present invention.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 7 shows a schematic view of a subsea electrical component including a capacitor bank according to the present invention, FIG. 8 shows a schematic view of a subsea system including the component of FIG. 7.

DETAILED DESCRIPTION OF THE EXAMPLE EMBODIMENT

Figure 1:
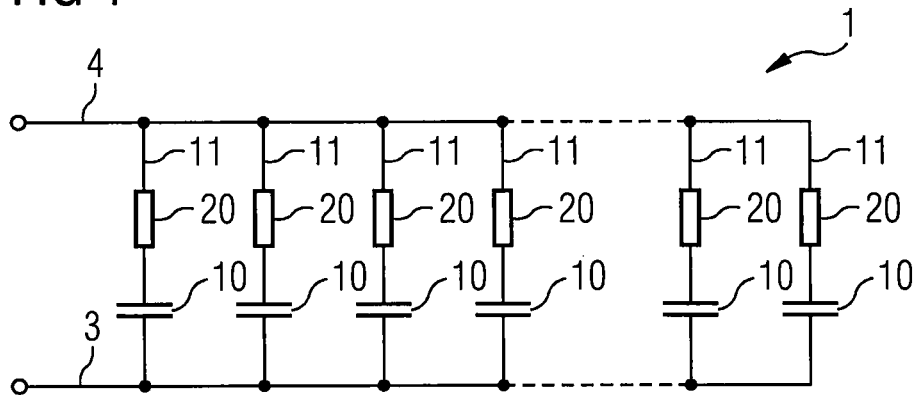
FIG. 1 shows a schematic view of a capacitor bank according to an embodiment of the present invention.

According to a first embodiment of the present invention, a capacitor bank comprises:

a plurality of capacitors, a plurality of resistors, each of the capacitors being in series with at least one of the resistors, a plurality of diodes, each of the diodes being in parallel with one of the resistors.

The resistors prevent the whole capacitor bank to be affected by a short circuit in a single capacitor either by just limiting the current or by fusing if the current value is too high.

Advantageously, the capacitor bank comprises a lot of parallel connections where a plurality of serial resistors is used for limiting the current into a shorted capacitor. This prevents the shorted capacitor from damaging the operation of the whole system. Further, the resistors prevent high inrush current values at power up.

Advantageously, embodiments of the present invention may be adapted to a great number of different configurations of capacitor banks, provided that, in each configuration, each resistor is connected in series with one capacitor or with a circuit having a plurality of capacitors connected in parallel or in series with one another.

The presence of the resistors increase the overall resistance and voltage drop in each circuit branch including one or more capacitors. This could affect, when requested during normal operations, the current value during discharging of capacitor bank. Advantageously, to increase the ability of the bank to deliver higher current during discharge, the resistors are paralleled by a diode to reduce the voltage drop at discharging.

According to an example embodiment of the present invention, each of the resistors is series with one of the capacitors, each pair of resistor and capacitor being connected in parallel with the other pairs.

According to possible example embodiments of the present invention, the plurality of capacitors are divided in a plurality of circuits, each of the resistors being in series with one of the circuit of capacitors. In particular, according to a possible example embodiment of the present invention, in each circuit the capacitors are electrically connected in parallel. According to another possible example embodiment of the present invention, in each circuit the capacitors are electrically connected in series.

According to possible example embodiments of the present invention, the plurality of capacitors includes film capacitors or ceramic capacitors.

Advantageously, embodiments of the present invention permit the use of more critical capacitors, like film capacitors or ceramic capacitors, which normally have a lower capacitance, and therefore are more subject to failure.

According to a second embodiment of the present invention, a subsea electrical component, for example a power cell or an electrical variable frequency drive, comprises a circuit including at least one capacitor bank for direct current (DC) storage according to at least one embodiment of the present invention.

This invention gives us the opportunity to an effective way of introducing redundancy to make a DC storage component with very high reliability.

FIG. 1 to FIG. 6 show possible embodiments of a capacitor bank 1, according to the present invention.

The capacitor bank 1 is for use as local energy storage for bridging a short power supply blackout (up to some seconds).

In all embodiments, the capacitor bank 1 includes a plurality of capacitors 10 between a first conductor 3 and a second conductor 4 between which an electric potential is subject to be established. The capacitor bank 1 further includes a second plurality of resistors 20, each of the capacitors 10 being in series with at least one of the resistors 20.

This allows that none of the capacitor 10 is directly connected between the first conductor 3 and the second conductor 4 and therefore a possible short circuit in one of the capacitor 10 is not subject to directly influence the other capacitors 10.

With reference to FIG. 7, the capacitor bank 1 is used as direct current storage component in power cell 100 for subsea applications.

The power cell 100 comprises a casing 50 of metal, such as carbon steel or stainless steel or aluminium.

Inside the casing 50, the power cell 100 comprises a circuit 60 for converting an electrical three phase input 61 into an electrical one phase output 62.

The circuit 60 comprises:

a diode rectifier 70 connected to the three phase input 61, a plurality of Insulated Gate Bipolar Transistors 75 connected to the one phase output 62. Transistors 75 are also electrically connected to the diode rectifier 70, the capacitor bank 1.

If the input 61 should fail for a period of time, the capacitor bank 1 enables continuous operation of the power cell 100.

The first conductor 3 and a second conductor 4 of the capacitor bank 1 are connected to the diode rectifier 70 and the plurality of transistors 75 by means of an H-bridge configuration.

The diode rectifier 70 and the plurality of Insulated Gate Bipolar Transistors 75 are mounted on the same side of the casing 50 in thermal contact with a heat sink 80, for promoting a thermal flow from the circuit 60 to the outside of the casing 50.

With reference to FIG. 8, an electrical variable frequency drive 200 comprises a plurality of power cells 100. The electrical drive 200 is usable in subsea implementations for providing a three phase electrical alimentation to an electrical motor M.

The electrical drive 200 comprises an enclosure 2 where a plurality of power cells 100 (eighteen power cells 100) are housed, immersed in a dielectric fluid 250, which is in contact with each power cell 100 for heat loss removal. The plurality of power cells 100 are divided in six groups (six power cells for each group). In each group all the power cells 100 are connected to a common output conductor 210, 211, 212, respectively. The three output conductor 210, 211, 212 electrically supply the three phase electrical motor M.

In the electrical variable frequency drive 200, the plurality of capacitor banks 1 (eighteen capacitor banks 1, one for each power cell 100) are used to provide a storage of direct current to be used when required by the electrical alimentation of the motor M.

With reference to the embodiment in FIG. 1, the capacitor bank 1 comprises a plurality of branches 11 connected in parallel between the first conductor 3 and the second conductor 4, each branch 11 comprising one resistor 20 in series with one of the capacitors 10.

Figure 2:
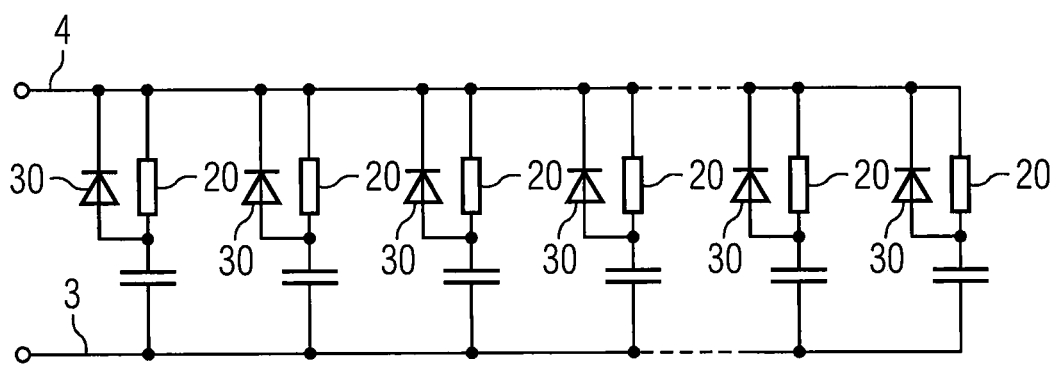
FIG. 2 shows a schematic view of a first alternative embodiment of a capacitor bank according to the present invention.

With reference to the embodiment in FIG. 2, the capacitor bank 1 further comprises a third plurality of diodes 30, each of the diodes 30 being in parallel with one of the resistors 20, for the rest being the embodiment in FIG. 2 identical to the embodiment in FIG. 1. Diodes 30 increase the ability of the capacitor bank 1 to deliver higher current during discharge, by-passing the resistors 20.

With reference to the embodiments in FIGS. 3 to 6, the capacitor bank 1 comprises a plurality of circuits 41, 42, 43, each circuit 41, 42, 43 comprising a plurality of capacitors 10. The capacitors in each circuit 41, 42, 43 are electrically connected with one another in series or parallel, and each of the resistors 20 are in series with one of the circuits 41, 42, 43.

Figure 3:
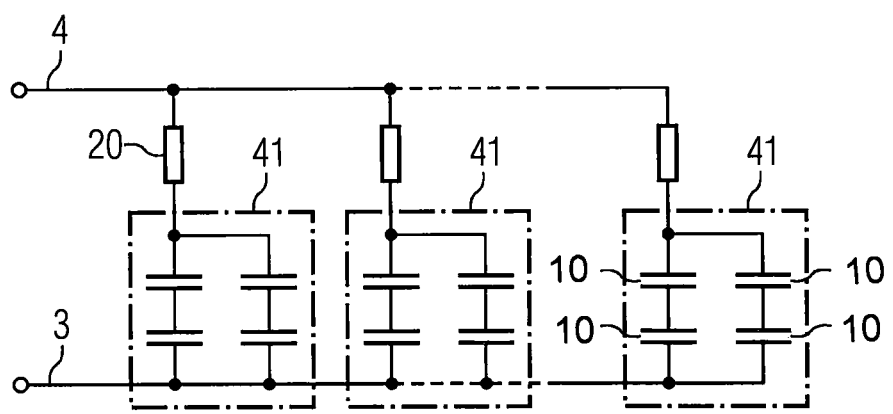
FIG. 3 shows a schematic view of a second alternative embodiment of a capacitor bank according to the present invention.
Figure 4:
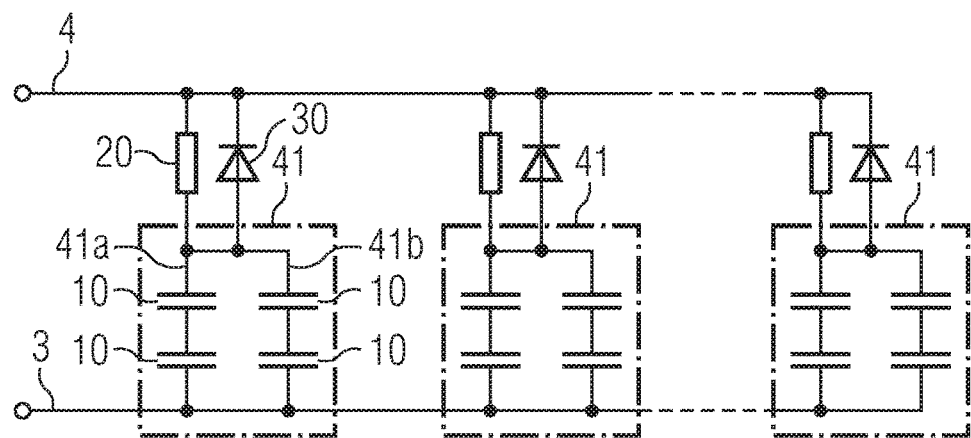
FIG. 4 shows a schematic view of a third alternative embodiment of a capacitor bank according to the present invention.

With reference to the embodiments in FIGS. 3 and 4, the plurality of capacitors 10 are divided in a plurality of circuits 41, each circuit comprising four capacitors 10. In each circuit 41 the four capacitors 10 are arranged in two branches 41*a*, 41*b* connected in parallel to each other, each branch 41*a*, 41*b* comprising two capacitors 10 connected in series. Each circuit 41 of four capacitors 10 is electrically connected between the first conductor 3 and one of the resistors 20. Each resistor 20 is electrically connected between a circuit 41 of four capacitors 10 and the second conductor 4. The embodiments in FIGS. 3 and 4 are similar, with the only difference that the embodiment in FIG. 4 further comprises a diode 30 in series with the resistor 20, with the same function of the diode in the embodiment in FIG. 2.

Figure 5:
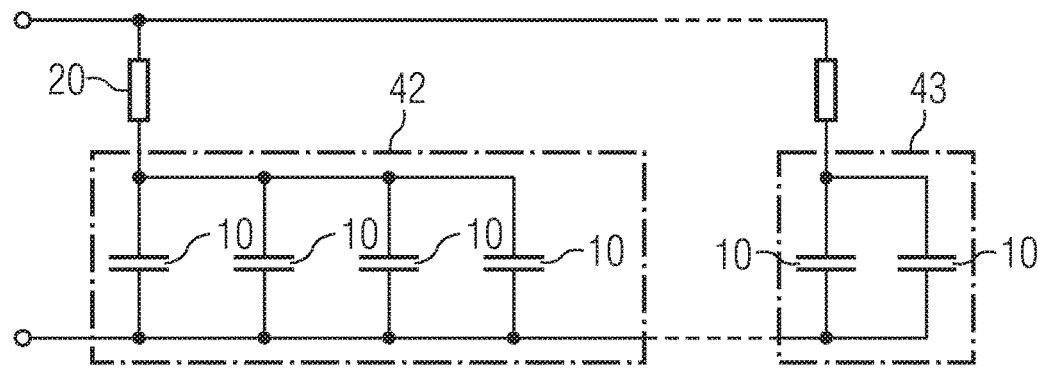
FIG. 5 shows a schematic view of a fourth alternative embodiment of a capacitor bank according to the present invention.
Figure 6:
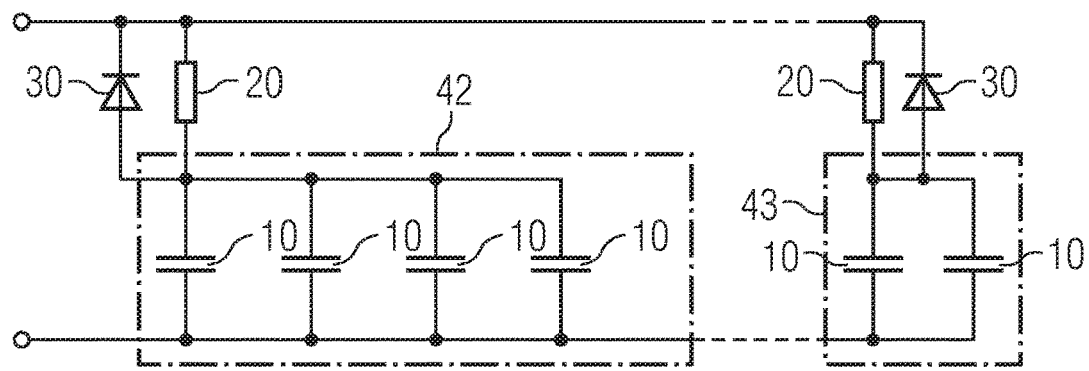
FIG. 6 shows a schematic view of a fifth alternative embodiment of a capacitor bank according to the present invention.

With reference to the embodiments in FIGS. 5 and 6, the plurality of capacitors 10 are divided in a plurality of circuits 42, 43. Each circuit 42, 43 comprises a plurality of capacitors 10, connected in parallel (four capacitors 10 for the first circuit 42 and two capacitors 10 for the second circuit 43). Each circuit 42, 43 of capacitors 10 is electrically connected between the first conductor 3 and one of the resistor 20. Each resistor 20 is electrically connected between a circuit 42, 43 of capacitors 10 and the second conductor 4. The embodiments in FIGS. 5 and 6 are similar, with the only difference that the embodiment in FIG. 6 further comprises a diode 30 in series with the resistor 20, with the same function of the diode in the embodiment in FIG. 2 and FIG. 4.

Many other embodiments not shown are possible in accordance with the present invention, each differentiating from the other for a different arrangement of the plurality of capacitors 10, provided that none of the capacitor is directly connected between the first conductor 3 and the second conductor 4.

In general, capacitors 10 may be of any type, for example electrolytic capacitors or film capacitors or ceramic capacitors may be used in the capacitor bank 1.

The invention claimed is:

1. A capacitor bank of a subsea electrical component, comprising:
   a plurality of energy storage capacitors;
   a plurality of resistors, each of the plurality of energy storage capacitors being in series with at least one of plurality of the resistors; and
   a plurality of diodes, each of the plurality of diodes being in parallel with one of the plurality of resistors for by-passing the respective resistors during discharge of the plurality of respective energy storage capacitors, wherein each of the plurality of resistors is in series with a respective one of said plurality of energy storage capacitors, each pair of one of the plurality of resistors and one of the plurality of energy storage capacitors being respectively connected in parallel with the other pairs of one other of the plurality of resistors and one other of the plurality of energy storage capacitors.

2. The capacitor bank of claim 1, wherein the plurality of energy storage capacitors include film capacitors.

3. The capacitor bank of claim 1, wherein the plurality of energy storage capacitors includes ceramic capacitors.

4. The capacitor bank of claim 1, wherein each of the plurality of energy storage capacitors is connected between a first conductor and one of the plurality of resistors and in series with at least one of plurality of the resistors, and each of the plurality of resistors is connected between one of the plurality of energy storage capacitors and a second conductor; and
   each of the plurality of diodes is oriented to let current flow from the one of the plurality of energy storage capacitors to the second conductor and in parallel with one of the plurality of resistors for by-passing the respective resistors during discharge of the plurality of respective energy storage capacitors.

5. A subsea power cell for converting an electrical three phase input into an electrical one phase output, comprising:
   a casing;
   a diode rectifier connected to the electrical three phase input;
   a plurality of Insulated Gate Bipolar Transistors connected to the electrical one phase output, the diode rectifier and the plurality of Insulated Gate Bipolar Transistors being mounted on a same side of the casing in thermal contact with a heat sink of the subsea power cell; and
   a capacitor bank comprising:
   a plurality of energy storage capacitors,
   a plurality of resistors, each of the plurality of energy storage capacitors being in series with at least one of the plurality of resistors,
   a plurality of diodes, each of the plurality of diodes being in parallel with a respective one of the plurality of resistors for by-passing respective the resistors during discharge of the plurality of respective energy storage capacitors, wherein each of the plurality of resistors is in series with one of said plurality of energy storage capacitors, each pair of one of the plurality of resistors and one of the plurality of energy storage capacitors being respectively connected in parallel with the other pairs of one other of the plurality of resistors and one other of the plurality of energy storage capacitors.

6. An electrical variable frequency drive, comprising:
   an enclosure, housing a plurality of the subsea power cells of claim 5, the plurality of power cells being immersed in a dielectric fluid.

7. The subsea power cell of claim 5, the capacitor bank comprises a plurality of circuits, each of the plurality of circuits including a plurality of energy storage capacitors, each of the plurality of resistors being in series with a respective one of the plurality of circuits.

8. The subsea power cell of claim 7, in each of the plurality of circuits, the respective energy storage capacitors are electrically connected in parallel.

9. The subsea power cell of claim 7, in of the plurality of circuits, the respective energy storage capacitors are electrically connected in series.

10. An electrical variable frequency drive, comprising:
    an enclosure, housing a plurality of the subsea power cells of claim 7, the plurality of power cells being immersed in a dielectric fluid.

11. The subsea power cell of claim 5, the plurality of energy storage capacitors include film capacitors.

12. The subsea power cell of claim 5, the plurality of energy storage capacitors includes ceramic capacitors.

13. The subsea power cell of claim 5, wherein each of the plurality of energy storage capacitors is connected between a first conductor and one of the plurality of resistors and in series with at least one of plurality of the resistors, and each of the plurality of resistors is connected between one of the plurality of energy storage capacitors and a second conductor; and each of the plurality of diodes is oriented to let current flow from the one of the plurality of energy storage capacitors to the second conductor and in parallel with one of the plurality of resistors for by-passing the respective resistors during discharge of the plurality of respective energy storage capacitors.

\* \* \* \* \*